United States Patent
Foreman et al.

(10) Patent No.: US 8,266,517 B2
(45) Date of Patent: Sep. 11, 2012

(54) CREATION OF AN INTERFACE FOR CONSTRUCTING CONVERSATIONAL POLICIES

(75) Inventors: Paul Evan Foreman, Austin, TX (US); David Perry Greene, Austin, TX (US); Philip Edward Light, Austin, TX (US); Razvan Loghin, Austin, TX (US); Anand Srinivasan, Arlington Heights, IL (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 12/131,215

(22) Filed: Jun. 2, 2008

(65) Prior Publication Data
US 2008/0235670 A1    Sep. 25, 2008

Related U.S. Application Data

(63) Continuation of application No. 11/122,611, filed on May 5, 2005, now abandoned.

(51) Int. Cl.
*G06F 17/27*    (2006.01)

(52) U.S. Cl. ..................... 715/211
(58) Field of Classification Search ............ 715/211
See application file for complete search history.

(56) References Cited

U.S. PATENT DOCUMENTS

| | | | |
|---|---|---|---|
| 4,509,167 A | 4/1985 | Bantel et al. |
| 5,377,997 A | 1/1995 | Wilden et al. |
| 5,526,407 A | 6/1996 | Russell et al. |
| 5,544,305 A | 8/1996 | Ohmaye et al. |
| 6,693,652 B1 | 2/2004 | Barrus et al. |
| 6,772,216 B1 | 8/2004 | Ankireddipally et al. |
| 6,778,970 B2 | 8/2004 | Au |
| 6,784,901 B1 | 8/2004 | Harvey et al. |
| 7,019,749 B2 | 3/2006 | Guo et al. |
| 7,039,920 B2 | 5/2006 | Wall et al. |
| 7,143,054 B2 | 11/2006 | Doherty |
| 7,143,135 B2 | 11/2006 | Smith et al. |
| 7,165,113 B2 | 1/2007 | Karp et al. |
| 7,444,383 B2 | 10/2008 | Horvitz |
| 7,729,922 B2 | 6/2010 | Chen et al. |
| 7,788,157 B2 | 8/2010 | Clark et al. |
| 7,929,470 B2 | 4/2011 | Minborg et al. |
| 7,970,826 B2 | 6/2011 | Kuno et al. |
| 8,122,084 B2 | 2/2012 | Beringer |
| 2002/0054072 A1 | 5/2002 | Hayes-Roth |
| 2002/0078041 A1 | 6/2002 | Wu |
| 2002/0091701 A1 | 7/2002 | Wall et al. |
| 2002/0120704 A1 | 8/2002 | Karp et al. |
| 2003/0046181 A1 | 3/2003 | Dow |
| 2003/0055711 A1 | 3/2003 | Doherty |
| 2003/0061361 A1 | 3/2003 | Bacik et al. |
| 2003/0120730 A1 | 6/2003 | Kuno et al. |
| 2003/0135586 A1 | 7/2003 | Minborg et al. |

(Continued)

OTHER PUBLICATIONS

Banerji et al., Web Services Conversation Language (WSCL) 1.0, Hewlett Packard Company, May 2001, pp. 1-21.

(Continued)

*Primary Examiner* — Laurie Ries
*Assistant Examiner* — Tionna Smith
(74) *Attorney, Agent, or Firm* — Yee & Associates, P.C.

(57) ABSTRACT

A method and apparatus for taking a visual or verbal representation of a conversational policy and translating the representation into an XML file. The XML file can then be output in one or more formats, such as code used in a policy, a Word version of the XML file, or a visual representation of the XML file.

16 Claims, 5 Drawing Sheets

U.S. PATENT DOCUMENTS

| | | |
|---|---|---|
| 2003/0144055 A1 | 7/2003 | Guo et al. |
| 2003/0154248 A1 | 8/2003 | Smith et al. |
| 2003/0191627 A1 | 10/2003 | Au |
| 2003/0204405 A1 | 10/2003 | Hanson et al. |
| 2004/0030753 A1 | 2/2004 | Horvitz |
| 2004/0034540 A1 | 2/2004 | Chen et al. |
| 2004/0068406 A1 | 4/2004 | Maekawa et al. |
| 2004/0083265 A1 | 4/2004 | Beringer |
| 2004/0088353 A1 | 5/2004 | Mendelsohn et al. |
| 2005/0209950 A1 | 9/2005 | Clark |
| 2005/0281470 A1 | 12/2005 | Adams |
| 2006/0253524 A1 | 11/2006 | Foreman et al. |
| 2006/0253843 A1 | 11/2006 | Foreman et al. |
| 2007/0162540 A1 | 7/2007 | Lee et al. |

OTHER PUBLICATIONS

Kuno et al., "Conversations + Interfaces = Business Logic," Hewlett Packard Company, May 2001, pp. 1-15.

Office Action regarding U.S. Appl. No. 10/128,864, dated Jun. 1, 2005, 16 pages.

Final Office Action regarding U.S. Appl. No. 10/128,864, dated Nov. 2, 2005, 15 pages.

Office Action regarding U.S. Appl. No. 10/128,864, dated Apr. 21, 2006, 17 pages.

Final Office Action regarding U.S. Appl. No. 10/128,864, dated Sep. 8, 2006, 18 pages.

Appeal Brief regarding U.S. Appl. No. 10/128,864, dated Feb. 5, 2007, 46 pages.

Examiner's Answer regarding U.S. Appl. No. 10/128,864, dated Apr. 26, 2007, 18 pages.

Decision on Appeal regarding U.S. Appl. No. 10/128,864, dated Nov. 20, 2008, 16 pages.

Notice of Allowance regarding U.S. Appl. No. 10/128,864, dated Apr. 14, 2009, 6 pages.

Final Office Action regarding U.S. Appl. No. 11/122,611, dated Mar. 15, 2010, 8 pages.

Office Action regarding U.S. Appl. No. 11/122,947, dated May 15, 2008, 9 pages.

Final Office Action regarding U.S. Appl. No. 11/122,947, dated Nov. 17, 2008, 11 pages.

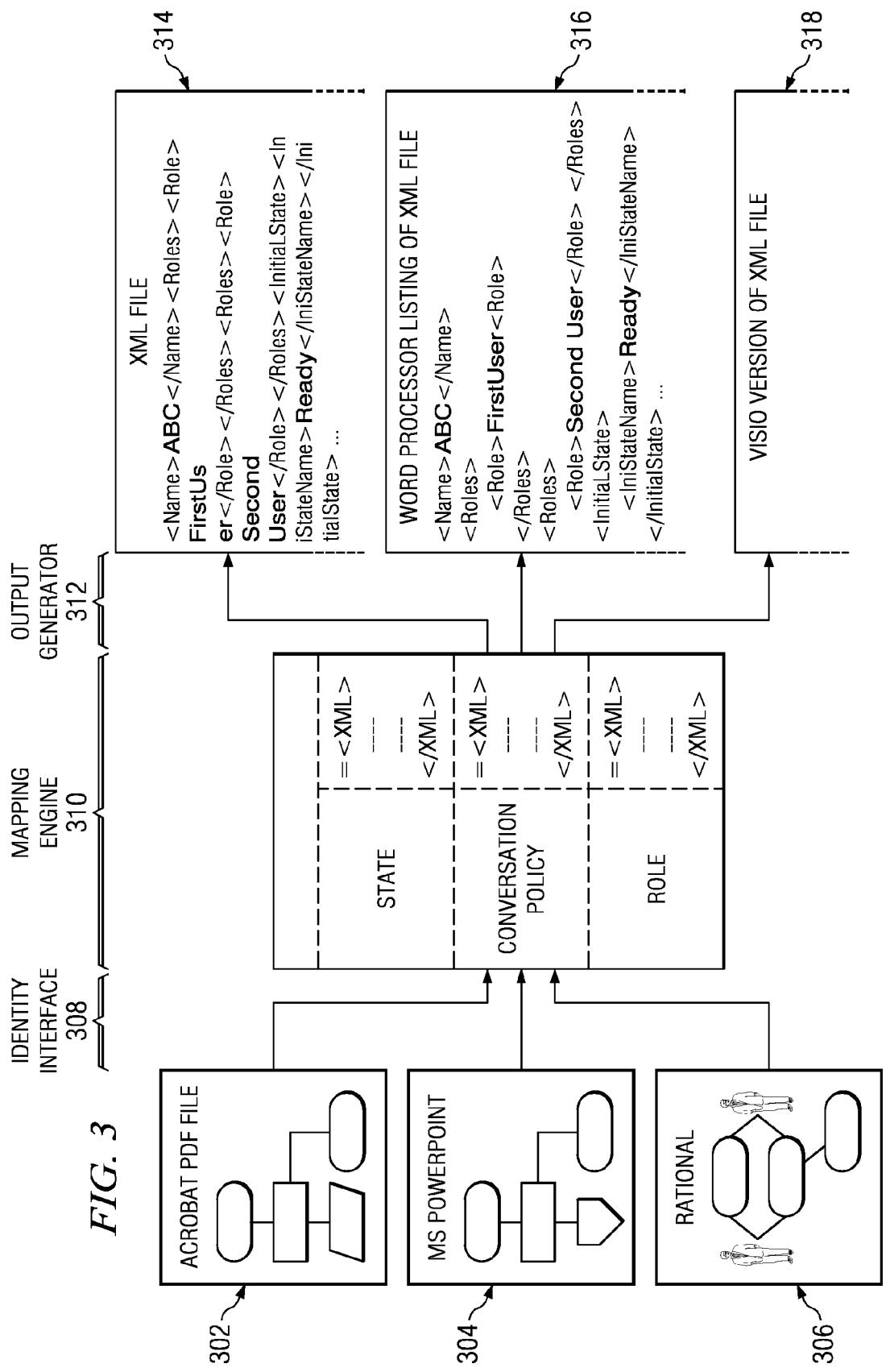

CREATION OF AN INTERFACE FOR CONSTRUCTING CONVERSATIONAL POLICIES

CROSS REFERENCE TO RELATED APPLICATIONS

The present application is related to copending U.S. patent application Ser. No. 11/122,947 entitled "Representations of Conversational Policies") filed even date herewith. The above mentioned patent application is assigned to the assignee of and share the same inventors as the present invention. The content of the cross referenced copending applications are hereby incorporated herein by reference.

This application is a divisional of application Ser. No. 11/122,611, filed May 5, 2005, status abandoned.

BACKGROUND OF THE INVENTION

1. Technical Field

The present invention is generally directed to network computing systems. More specifically, the present invention is directed to providing policies that govern transactions between two or more network computer systems. Even more specifically, the present invention is directed to an apparatus and method for creating an interface by which conversation policies can be constructed for agents in a network computing system.

2. Description of Related Art

In interactions between humans and an electronic business system or between two applications in an enterprise application system, participants, whether programs in the systems or humans, interact by sending messages to each other. These interactions can be brief, such as a simple query and answer, or they can be extended, such as in the negotiation of a sale of products or services, where significant information, offers, and counter-offers can be exchanged. U.S. Patent Application 20030204405, published Oct. 30, 2003, which is owned by the assignee of the current application and is hereby incorporated by reference, discloses a means for providing modular conversation policies. This provides a structure in which policies can be brought in from an outside source and modified to meet a specific business system.

As the use of such conversational policies becomes more common, it becomes increasingly desirable to be able to write new policies and to modify old policies. The policies are currently created in a form of extensible markup language (XML), a language that uses tags. However, the rigid structure of an XML tree does not lend itself to error-free coding. A different manner of writing policies is needed.

SUMMARY OF THE INVENTION

The present invention provides a method and apparatus that can take a visual or verbal representation of a conversational policy and translate the visual or verbal representation into an XML file. The XML file can then be output in one or more formats, such as code used in a policy, a Word version of the XML file, or a Visio representation of the XML file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 graphically depicts the three parts of the inventive structure and method, according to an embodiment of the invention.

DETAILED DESCRIPTION OF THE PREFERRED EMBODIMENT

Hardware

Figure 1:
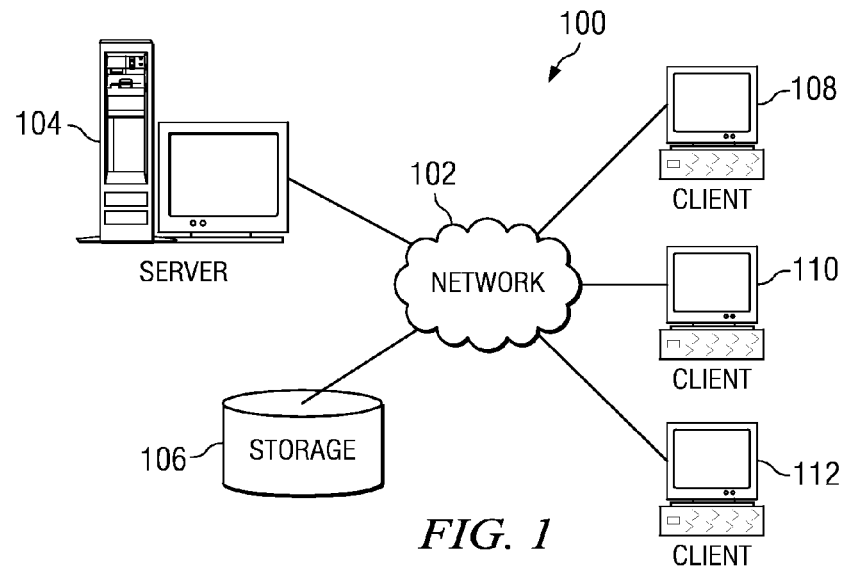
FIG. 1 depicts a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
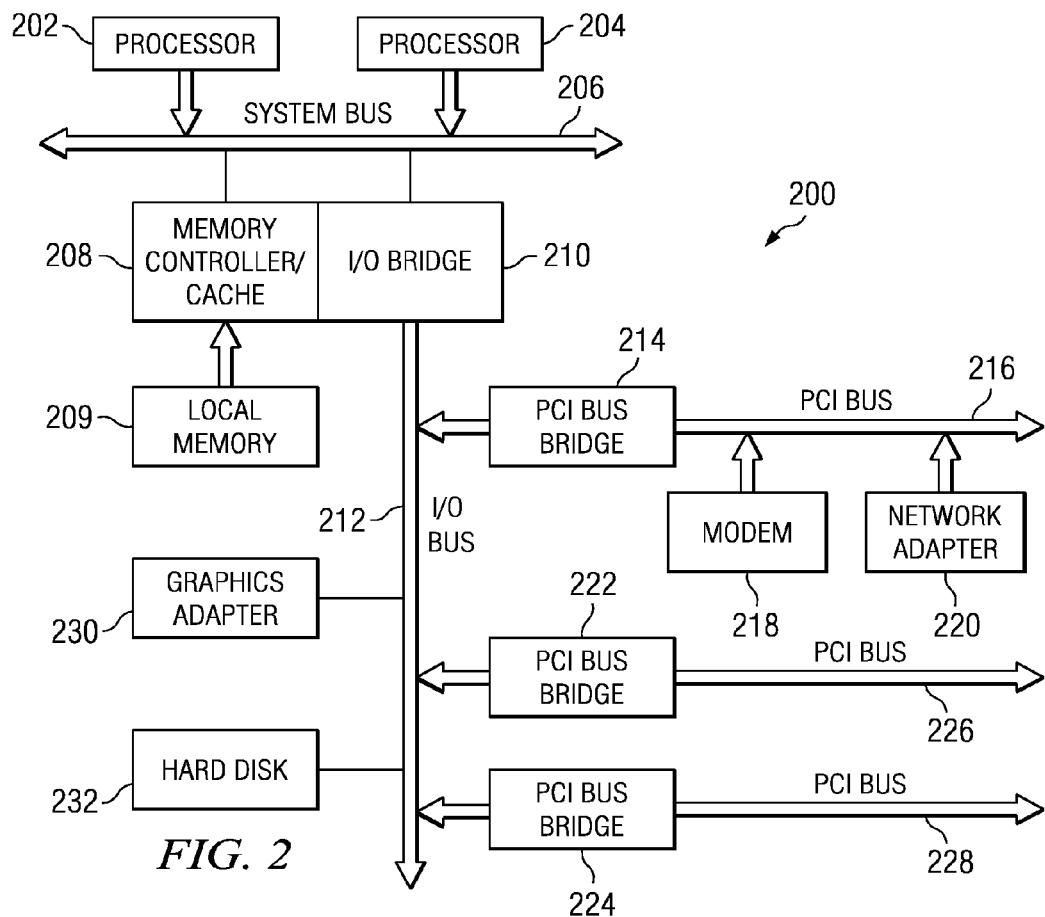
FIG. 2 depicts a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Overview of Modules

With reference now to FIG. 3, a graphic representation of the three main parts of the inventive structure and method are shown according to an illustrative embodiment of the invention. On the left-hand side of this figure, three possible input files are shown: file 302 is in Adobe® Acrobat®, file 304 is in Microsoft® Powerpoint®, and file 306 is in IBM® Rational Rose®, a software development platform. Notably, these three input formats are only representative of the types of input that can be received by the inventive interface; many other types of input can also be used, such as text description or other graphic representations. The idea is that the user can work in whatever format they feel most comfortable with, while the inventive software will handle the interface to the required format transparently.

Identity interface 308 takes an input file, such as files 302, 304, 306 and identifies objects and descriptions that exist in the input files, using either identification provided in the files or by querying the user. Once identity interface 308 is completed, mapping engine 310 performs mapping between policy objects that have been identified and the xml structures that represent them. A table holds the entries and the sections of code that will be saved to the xml tree. Finally, output generator 312 translates the prepared xml tree into a desired format. Several possible outputs are shown in this figure: file 314 is in Conversation Policy XML (CPXML), file 316 is a text description of the policy, and file 318 is a visual representation of the policy. Like the input, the output format can be as varied as the input, such that once the policy is created, it can be viewed in whatever format is considered most appropriate to the user's needs, whether that need is to execute the conversational policy, to be able to view it for modification, to give a presentation of the policy, etc. The sections of the inventive interface will be discussed in greater detail below. It is noted that while these modules are discussed as if they are three separate modules, the actual boundaries between the modules need not be as discussed, as long as the capabilities are present.

Modules

Identity Interface 308 has the job of identifying each item in the conversation policy. Exemplary modules designed to serve this purpose will share the same recognition algorithm, but may vary in the specifics, for example, of how to recognize a given shape in the specific format. The identity interface must accomplish several tasks:

(a) it must distinguish between a state and an action to move between the states, (b) it must identify the starting state, (c) for every state, it must identify every action that is possible in order to leave the state, and (d) for every action, it must identify the beginning state, the ending state, and the identity of the entity performing the action.

Figure 4A:
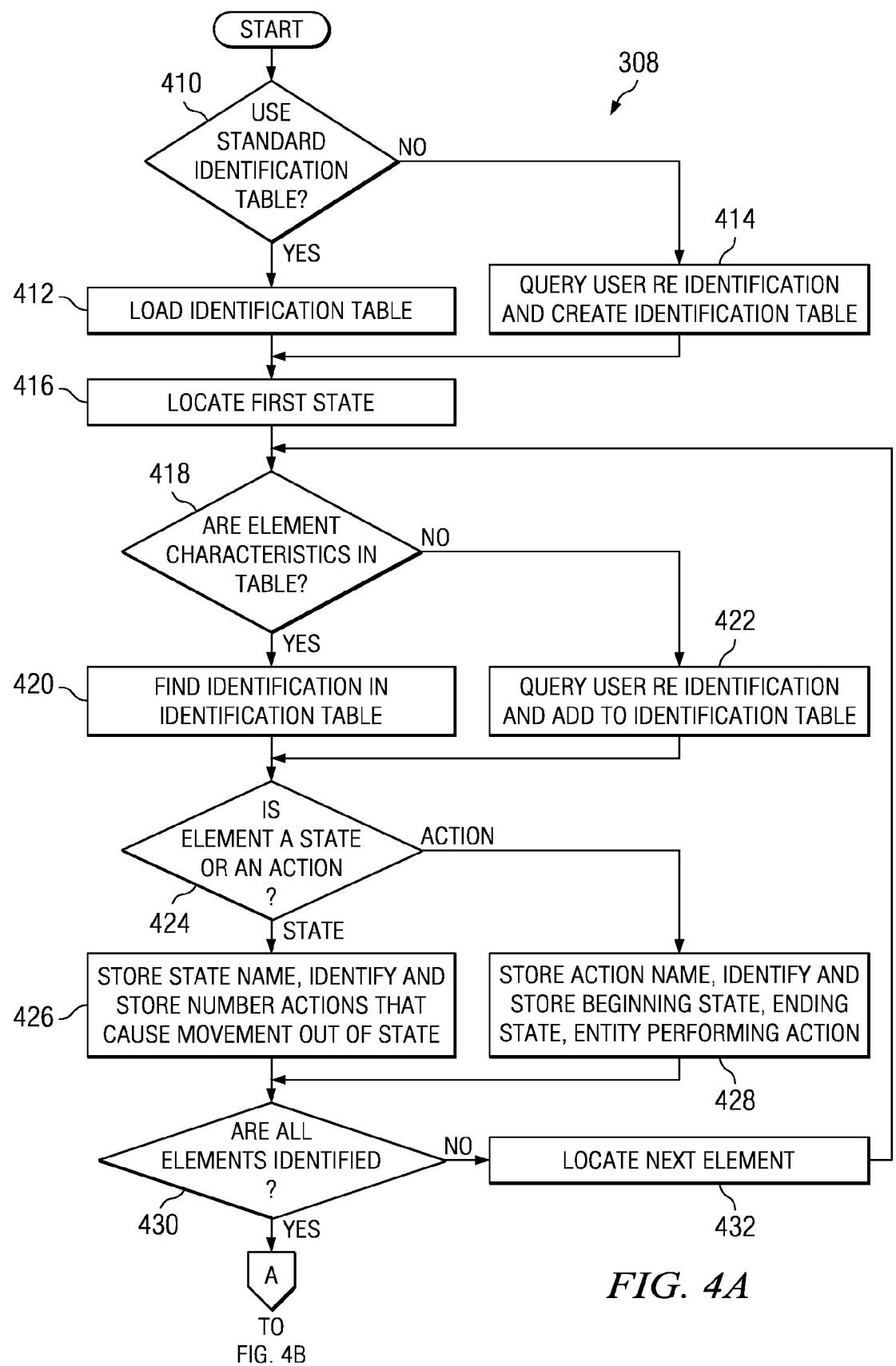
FIGS. 4A and 4B depict a flowchart of the action of the identification interface of FIG. 3 according to an exemplary embodiment of the invention.

With reference now to FIG. 4A, a flowchart of the identity interface 308 is discussed according to an exemplary embodiment of the invention. The flowchart starts with a determination whether or not to use the standard identification table provided (step 410). This table identifies the meaning of each figure or shape in the conversational policy. The table is generally initialized with standard shapes and their given meaning, but the user may also define their own meanings and even new shapes, so that they can work with whatever symbols seem most intuitive to them. Thus, if the user chooses to use the existing identification table, the flow goes to load identification table (step 412). If the user wants to define their own symbols and/or meanings, the flow moves to a session in which the program queries the user and creates a new identification table (step 414). Although not specifically shown in this figure, the user can be allowed to save their definitions such that they can be used at a later time. Once the identification table is ready, the identity interface locates the initial state where the conversation begins (step 416). For graphical representations, the initial state will generally be located in the top left-hand corner. Alternatively, the user can be asked to identify the initial state. The program then determines if the element is described in the table or not (step 418). If the element is present in the table, the program looks up the identification of this element (step 420), otherwise, the program will query the user about the identification of the element, then will store the new shape and meaning in the identification table (step 422). The identity interface can then determine if the element is a state or an action (step 424). If the element is a state, the name of the state is stored, then the number of actions that cause movement out of this state are determined and saved (step 426); if the element is an action, the program stores the name of the action, the state where the action begins, the state where the action ends, and the entity performing the action (step 428). After the appropriate information is stored for the current element, a check is made to see if there are more elements to be identified (step 430). If additional elements remain, the program moves to identify the next element (step 432) and return to process that element (step 418); if all elements have been identified, identity interface continues in FIG. 4B.

Figure 4B:
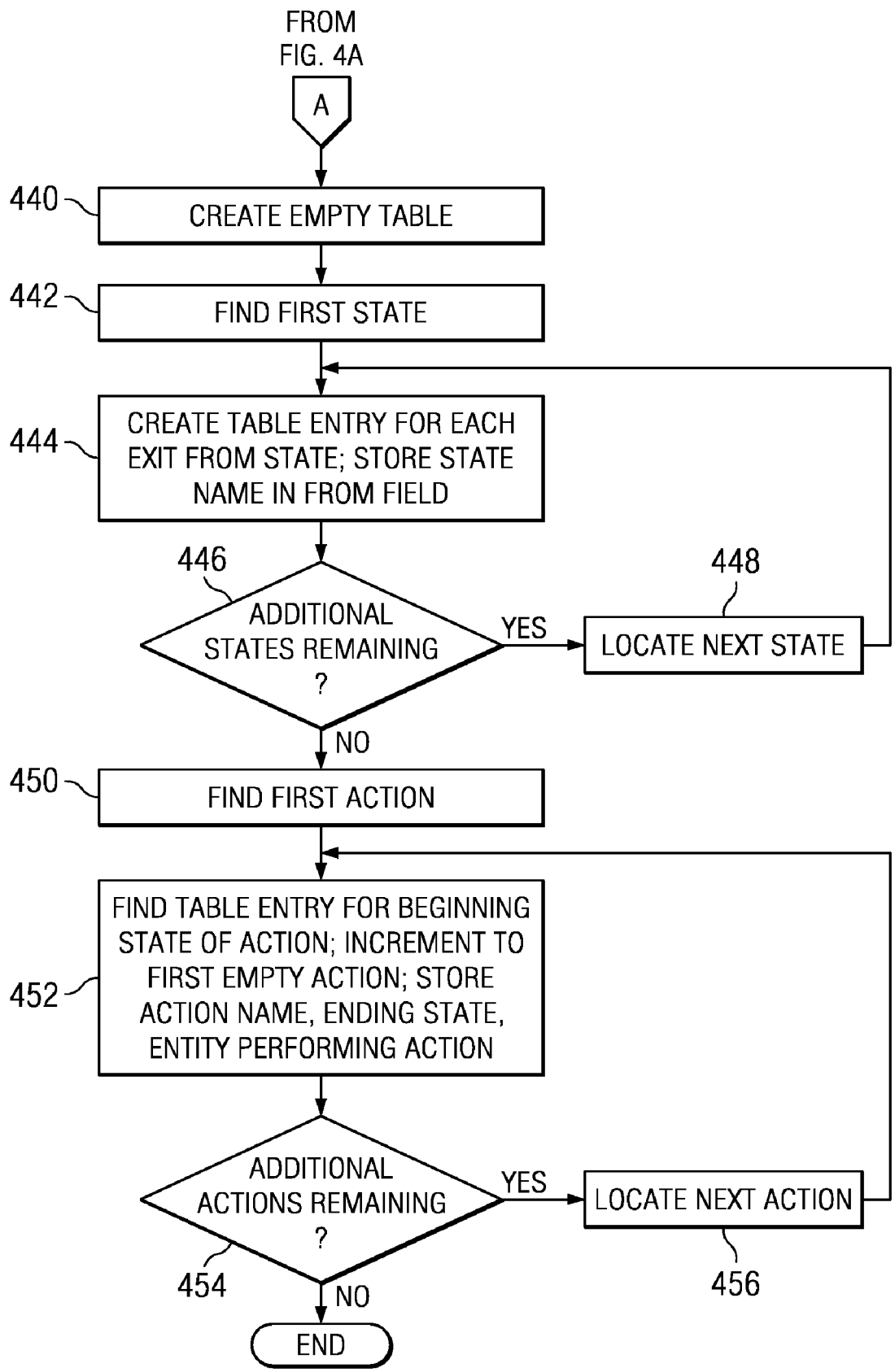

With reference now to FIG. 4B, the identity interface organizes the information it has identified, setting up a blank table into which the information will be organized (step 440). Each entry in the table will have at least the following four fields (a) beginning state, (b) action, (c) ending state, and (d) performer. The identity interface then goes through the information it has identified and searches to find the first identified state (step 442). For each action that can be taken to move out of that state, an entry in the table is created (step 444) and the name of the current state is stored in the beginning state field (a). For example, if the current state is a determination if a condition is true or false, two actions will move the conversation out of that state: an answer of 'true' or an answer of 'false'. In this instance, two entries in the table would be created with a beginning state of 'Determine Condition': one with a 'true' message and the other having a 'false' message. If a state is a termination point for the conversation, there will not be any actions that move the conversation out of that state. In this instance, a single entry is created in the table, with the state name stored in the beginning state field (a), but no other fields filled.

Once an entry for a state is fully created, the mapping engine determines if there is a next state (step 446). If the answer is 'yes', the next state is located (step 448) and the mapping engine returns to create the proper number of new table entries (step 444); otherwise, the mapping engine returns to the beginning of the file and searches for the first action (step 450).

When an action is located, it will have a beginning state and an ending state, as previously determined. The identity interface 310 locates the table entry for the corresponding beginning state and action, and then fills in the ending state and the performer (step 452). The mapping engine 310 then looks to see if there are any additional actions to be entered (step 454). If there are, the mapping engine locates the next action (step 456) and returns to fill in the next table entry (step 452); otherwise, the mapping engine has completed forming the table and terminates.

In an alternate embodiment, the identity interface can create the table by a single pass through the information collected. In this embodiment, the identity interface creates an empty table structure. For each action shown in the input, the program creates an entry in the table that contains the four fields listed above. A separate entry for a state is created only for the beginning state, which must be identified as such, and for terminal states, which have no actions leading out of them. Preferably, once all entries are made, the table should be sorted so that all actions associated with a given step are listed together for ease of translation into XML.

Notably, the identification process is not limited to objects, such as shapes, but can apply the identification to descriptions or patterns. For example, a user might describe a conversation policy in words that could then be identified and mapped. The ability to learn meanings and to recognize them later makes this program very flexible.

Once the identity interface has created the disclosed table, the mapping engine 310 will create the appropriate coding for an XML tree for the conversation. This is a fairly straightforward translation and involves moving through the table, creating and assembling coding fragments. Because XML is a very flexible language, the 'universe' that the coding represents must be defined in a schema for conversation policies, which forms an XML fragment for the tree. XML requires that (a) the overall conversation be given a name by which it can be addressed, (b) each participant in a dialog be defined as a role, (c) each state must contain a unique name and must contain any necessary information to perform the needed actions of the role, and (d) each possible transition from that state must be described. Since the states and actions have already been assembled into a table, the inventive program can routinely convert them to an XML tree. Where further clarification is needed, the user can be queried for information.

The final portion of the innovative method is the output generator 312. The output generator 312 can take the XML tree created by mapping engine 310 and convert this to the form desired by the user. This can be an XML file, which can be checked against company policies and validated, then executed. It can also be a Word® document, showing the XML file in a format more easily readable by humans. The output can also be provided in a graphical format. For instance, after a conversational policy is created, a user may wish to provide a presentation of the idea; they can then convert the XML tree to an output format compatible with a presentation, such as Microsoft® Powerpoint®.

Example

In order to clarify the idea disclosed, an exemplary conversation policy is shown as an embodiment of the inventive method and apparatus converts it into XML.

Figure 5A:
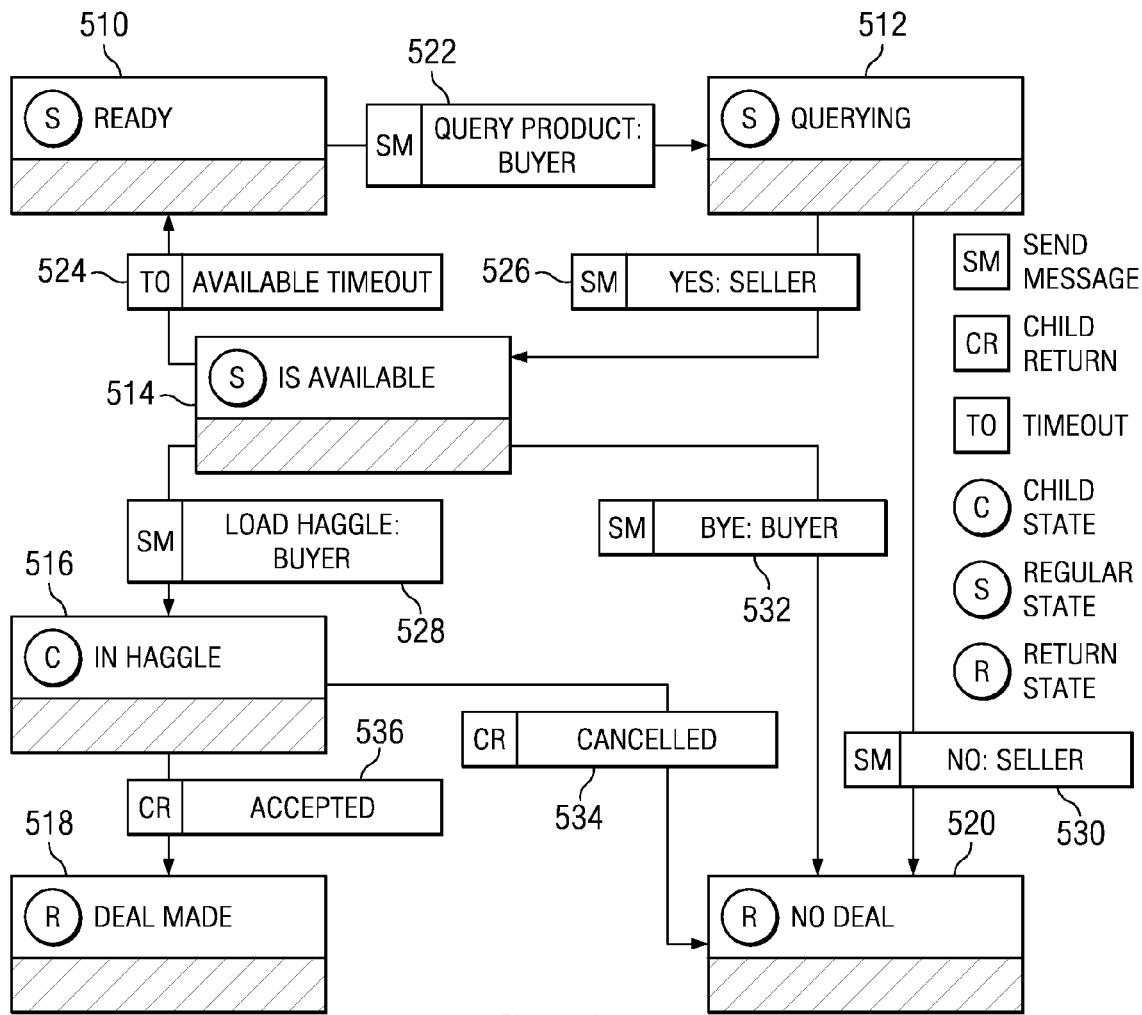
FIGS. 5A and 5B depict two representations of a single conversational policy that might be input to an embodiment of the disclosed programs.

With reference now to FIG. 5A, an exemplary conversation policy is graphically shown. In this example, the conversation is between a buyer and a seller and is in regard to the availability and purchase of a product or service. Conversations between humans and machines or between two machines are inherently stateful, i.e. the content of any earlier messages constrains or partially determines the content of possible messages later on, so that at any given point, the conversation is either in a given state or in transition between two states. In the convention used by this figure, a state is shown by a rectangle, the lower half of which is hatched, while the upper half contains the name of the state and a circled letter indicating the type of state: a regular state contains an S in the circle, a child state contains a C, and a response state contains an R. As the name implies, a child state can be a separate conversation policy that is called by the current policy, which will return a response chosen from a set of allowable responses. The types of actions that are used to move between states are: sending a message SM, giving a response from a child state CR, or incurring a timeout TO. The conversation policy begins with the Ready State 510. There is only one way to move out of the Ready State 510, i.e., the buyer sends message 522 querying the availability of an item or service. When a message of this type is sent and received, the conversation moves to the Querying State 512. While in the Querying State 512, the seller is checking to see if the requested item or service can be supplied. The response will be to provide one of two replies: yes or no. If the product is not available, the seller sends a 'No' message 530, which moves the conversation to the 'No Deal' state 520, which completes this conversation. It is, of course, possible to start another conversation by querying the availability of another product, but the original conversation has reached a conclusion. Alternatively, if the item is available, sending a 'Yes' message 526 moves the conversation to the 'Is Available' state 514. According to the conversation policy shown, three responses are available and thus, three routes exist out of this state. In the first response, the buyer only wanted information at this time, so they send a "Bye" message 532, which moves the conversation to the "No Deal" state 520. In a second response, the buyer shows interest in pursuing the transaction, sending a "Load Haggle" message 528, which moves the conversation to the 'In Haggle' state 516, which is a child state. A final way to leave the 'Is Available' state is for the buyer to give no response, so that the transaction incurs a timeout 524 and returns to the Ready state 510. For conversations that have reached the 'In Haggle' state 516, this state will be maintained until either an agreement is reached between the two parties or else one party determines that a mutually satisfactory conclusion cannot be reached. If the In Haggle state 516 ends with a response of 'Accepted' 536, the conversation moves to the 'Deal Made' state 518 and concludes. Otherwise, a 'Cancelled' response 534 is sent and the conversation moves to the 'No Deal' state 520 and concludes.

Figure 5B:
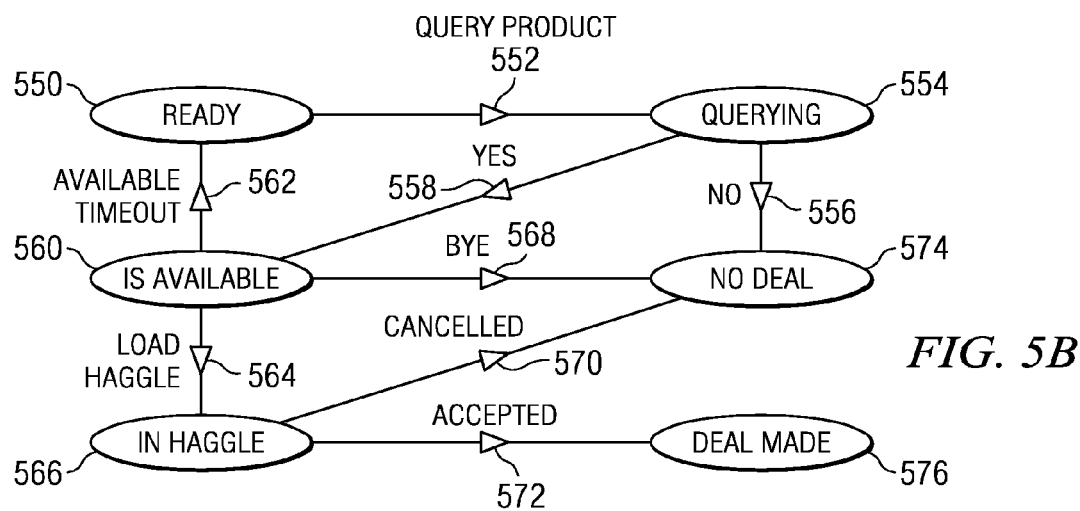

This same conversation policy can also be represented in a somewhat different manner, depending on the user and the visual system used to represent the policy. FIG. 5B depicts an alternate way to represent the same conversation policy. In this figure, the various states are shown by ovals, with the events that prompt a change of state shown as arrows. Again, the conversation initially starts from the 'Ready' state 550 and from this state the only input that can cause movement is a 'Query Product' 552, which moves the conversation to a 'Querying' state 554. If the product is not available, a 'No' response 556 moves the conversation to the 'No Deal' state 574. If the product is available, a 'Yes' message 558 moves the conversation to the 'Is Available' state 560. From the 'Is Available' state 560, the conversation can move in three directions: an available timeout 562 returns the conversation to a 'Ready' state 550, a 'Bye' message 568 from the buyer moves the conversation to a 'No Deal' state 574, or a 'Load Haggle' message 564 from the buyer moves the conversation to a 'In Haggle' state 566. If the conversation moves to the 'In Haggle' state, the conversation will either end with a return message of 'Cancelled' 570, which ends in a 'No Deal' state 574 or 'Accepted' 572, which ends in a 'Deal Made' message 576.

For either of the two FIGS. 5A and 5B, identity interface 308 identifies each item and description represented in the conversation policy, using a table that identifies the meaning of the shapes represented. Once each state and action has been identified the identity interface will create a table such as the one shown in Table 1.

TABLE 1

| Beginning State | Action | Ending State | Performer |
|---|---|---|---|
| Ready | Query product message | Querying | Buyer |
| Querying | Yes message | IsAvailable | Seller |
| Querying | No message | NoDeal | Seller |
| IsAvailable | Timeout | Ready | Timeout |
| IsAvailable | LoadHaggle message | InHaggle | Buyer |
| IsAvailable | Bye | NoDeal | Buyer |
| InHaggle | Accepted | DealMade | Child Response |
| InHaggle | Cancelled | NoDeal | Child Response |
| DealMade | | | |
| NoDeal | | | |

Mapping engine 310 next takes the information in Table 1 and creates appropriate coding fragments to go with each element. For example, the roles can be defined as a buyer and a seller with coding such as,

```
<Roles>
    <Role>Buyer</Role>
</Roles>
<Roles>
    <Role>Seller</Role>
</Roles>
```

Each state will have its name defined and the transitions out of it coded,

<State StateId="Name"> . . . </State>

The information needed to describe this state is described in code, such as the transitions out of this state. If the state is a child state, the appropriate child must be encoded. Shown below is a printout of an XML file created from Table 1.

```
<ConversationPolicy xmlns:xsi="http://www.w3.org/2001/XMLSchema-instance"
    xsi:noNamespaceSchemaLocation="ConversationPolicy2.0.xsd">
  <Name>BuyStuff</Name>
  <Roles>
    <Role>Buyer</Role>
  </Roles>
  <Roles>
    <Role>Seller</Role>
  </Roles>
  <InitialState>
    <IniStateName>Ready</IniStateName>
  </InitialState>
  <State StateId="Ready">
    <SendMessageTransition TransitionName="QueryProduct">
      <Target>Querying</Target>
      <Sender>Buyer</Sender>
      <Event>SendMessage</Event>
      <Message>
        <Encoding>java</Encoding>
        <Schema>com.ibm.conversation.BuySellCA.-
        ProductQueryMessageSchema</Schema>
      </Message>
    </SendMessageTransition>
  </State>
  <State StateId="Querying">
    <SendMessageTransition TransitionName="No">
      <Target>NoDeal</Target>
      <Sender>Seller</Sender>
      <Event>SendMessage</Event>
      <Message>
        <Encoding>java</Encoding>
        <Schema>com.ibm.conversation.-
        BuySellCA.NoMessageSchema</Schema>
      </Message>
    </SendMessageTransition>
    <SendMessageTransition TransitionName="Yes">
      <Target>IsAvailable</Target>
      <Sender>Seller</Sender>
      <Event>SendMessage</Event>
      <Message>
        <Encoding>java</Encoding>
        <Schema>com.ibm.conversation.-
        BuySellCA.YesMessageSchema</Schema>
      </Message>
    </SendMessageTransition>
  </State>
  <State StateId="IsAvailable">
    <Timeout>P5M</Timeout>
    <TimeoutTransition TransitionName="AvailableTimout">
      <Target>Ready</Target>
      <Event>OnTimeout</Event>
    </TimeoutTransition>
    <SendMessageTransition TransitionName="LoadHaggle">
      <Target>InHaggle</Target>
      <Sender>Buyer</Sender>
      <Event>SendMessage</Event>
      <Message>
        <Encoding>java</Encoding>
        <Schema>com.ibm.conversation.-
        BuySellCA.LoadHaggleMessageSchema</Schema>
      </Message>
    </SendMessageTransition>
    <SendMessageTransition TransitionName="Bye">
      <Target>NoDeal</Target>
      <Sender>Buyer</Sender>
      <Event>SendMessage</Event>
      <Message>
        <Encoding>java</Encoding>
        <Schema>com.ibm.-
        conversation.BuySellCA.ByeMessageSchema</Schema>
      </Message>
    </SendMessageTransition>
  </State>
  <State StateId="InHaggle">
    <LoadChild>
      <Policy>buysellhaggle.cpxml</Policy>
      <Rolemap>
        <RolemapElement>
          <Parent>Buyer</Parent>
```

-continued

```
        <Child>Initiator</Child>
      </RolemapElement>
      <RolemapElement>
        <Parent>Seller</Parent>
        <Child>Responder</Child>
      </RolemapElement>
    </Rolemap>
  </LoadChild>
  <ChildReturnTransition TransitionName="Accepted">
    <Target>DealMade</Target>
    <Event>ChildReturn</Event>
    <ChildReturn>Accepted</ChildReturn>
  </ChildReturnTransition>
  <ChildReturnTransition TransitionName="Cancelled">
    <Target>NoDeal</Target>
    <Event>ChildReturn</Event>
    <ChildReturn>Cancelled</ChildReturn>
  </ChildReturnTransition>
</State>
<State StateId="NoDeal">
  <Return>NoDeal</Return>
</State>
<State StateId="DealMade">
  <Return>DealMade</Return>
</State>
</ConversationPolicy>
```

Finally, the XML tree, once created by the mapping engine 310, can be placed in one of several formats by the output generator. The listing above is the XML file in Word format, easily read and comprehended by a user. In XML format, the coding can be input to a machine for validation. Other formats can also be produced.

Using the disclosed invention, a conversational policy can be described in a visual format that is easy for users to comprehend and manipulate. The transformation into machine-usable coding is performed by machine, removing the tediousness of the process and avoiding human errors in the actual coding process. Since a number of visual or written formats can be utilized, the user is free to find the format that is intuitively best for them without sacrificing quality in the finished product.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of constructing a conversation policy, said method comprising the computer-performed steps of:
receiving a conversational policy that has been created in a graphical or verbal form;
identifying elements of said conversational policy by identifying a plurality of states of a conversation and a plurality of actions;
creating a table, wherein each entry in said table includes a beginning state field, an action field, an ending state field, and a performer field;
locating a first one of said plurality of states;
identifying a first plurality of said plurality of actions that will move said conversation out of said first one of said plurality of states;
for each one of said first plurality of said plurality of actions:
creating a separate entry in said table;
storing a name of said first one of said plurality of states in a beginning state field in said separate entry;
storing a name of said one of said first plurality of said plurality of actions in an action field in said separate entry;
storing a name of a second one of said plurality of states to which said conversation is moved in response to an occurrence of said one of said first plurality of said plurality of actions in an ending state field in said separate entry; and
storing a name of a performer of said one of said first plurality of said plurality of actions in a performer field in said separate entry;
locating a second one of said plurality of states, wherein said second one of said plurality of states is a termination point of said conversation;
storing a name of said second one of said plurality of states in a beginning state field of a particular entry in said table, wherein nothing is stored in an action field of the particular entry, an ending state field of the particular entry, and a performer field of the particular entry; and
using said table to construct a file in an extensible machine language that describes the conversational policy.

2. The method of claim 1, further comprising converting said file into a format other than an extensible machine language.

3. The method of claim 1, wherein said conversational policy is received in a format created by a program chosen from a group consisting of a word processor, a presentation graphics program, a drawing program, and a software development platform.

4. The method of claim 1, wherein said identifying elements step uses a second table of standard elements having associated meanings.

5. The method of claim 1, wherein said identifying elements step recognizes a first shape as representing a third one of said plurality of states and a second shape as representing a second one of said plurality of actions.

6. The method of claim 1, wherein said identifying elements step recognizes a first pattern as representing a third one of said plurality of states and a second pattern as representing a second one of said plurality of actions.

7. A computer system, comprising:
a processor, connected to receive input and to write output;
memory, connected to said processor; and
a set of instructions stored in said memory and connected to be executed by said processor, said set of instructions containing instructions for receiving a conversational policy that has been created in a graphical or verbal form; second instructions for identifying elements of said conversational policy by identifying a plurality of states of a conversation and a plurality of actions; instructions for creating a table, wherein each entry in said table includes a beginning state field, an action field, an ending state field, and a performer field; instructions for locating a first one of said plurality of states; instructions for identifying a first plurality of said plurality of actions that will move said conversation out of said first one of said plurality of states; for each one of said first plurality of said plurality of actions: instructions for creating a separate entry in said table; instructions for storing a name of said first one of said plurality of states in a beginning state field in said separate entry; instructions for storing a name of said one of said first plurality of said plurality of actions in an action field in said separate entry; instructions for storing a name of a second one of said plurality of states to which said conversation is moved in response to an occurrence of said one of said first plurality of said plurality of actions in an ending state field in said separate entry; and instructions for storing a name of a performer of said one of said first plurality of said plurality of actions in a performer field in said separate entry; instructions for locating a second one of said plurality of states, wherein said second one of said plurality of states is a termination point of said conversation; instructions for storing a name of said second one of said plurality of states in a beginning state field of a particular entry in said table, wherein nothing is stored in an action field of the particular entry, an ending state field of the particular entry, and a performer field of the particular entry; and instructions for using said table to construct a file in an extensible machine language that describes the conversational policy.

8. The computer system of claim 7, wherein said set of instructions further comprises instructions for converting said file into a format other than an extensible machine language.

9. The computer system of claim 7, wherein said conversational policy is received in a format created by a program chosen from a group consisting of a word processor, a presentation graphics program, a drawing program, and a software development platform.

10. The computer system of claim 7, wherein said instructions for identifying elements recognize a first shape as representing a third one of said plurality of states and a second shape as representing a second one of said plurality of actions.

11. The computer system of claim 7, wherein said instructions for identifying elements recognize a first pattern as representing a third one of said plurality of states and a second pattern as representing a second one of said plurality of actions.

12. A computer program product on a non-transitory computer-readable media, said computer program product comprising:
instructions for receiving a conversational policy that has been created in a graphical or verbal form;
instructions for identifying elements of said conversational policy by identifying a plurality of states of a conversation and a plurality of actions;
instructions for creating a table, wherein each entry in said table includes a beginning state field, an action field, an ending state field, and a performer field;
instructions for locating a first one of said plurality of states;
instructions for identifying a first plurality of said plurality of actions that will move said conversation out of said first one of said plurality of states;
for each one of said first plurality of said plurality of actions:
instructions for creating a separate entry in said table;
instructions for storing a name of said first one of said plurality of states in a beginning state field in said separate entry;
instructions for storing a name of said one of said first plurality of said plurality of actions in an action field in said separate entry;
instructions for storing a name of a second one of said plurality of states to which said conversation is moved in response to an occurrence of said one of said first plurality of said plurality of actions in an ending state field in said separate entry; and
instructions for storing a name of a performer of said one of said first plurality of said plurality of actions in a performer field in said separate entry;
locating a second one of said plurality of states, wherein said second one of said plurality of states is a termination point of said conversation;
instructions for storing a name of said second one of said plurality of states in a beginning state field of a particular entry in said table, wherein nothing is stored in an action field of the particular entry, an ending state field of the particular entry, and a performer field of the particular entry; and
instructions for using said table to construct a file in an extensible machine language that describes the conversational policy.

13. The computer program product of claim 12, instructions for converting said file into a format other than an extensible machine language.

14. The computer program product of claim 12, wherein said said conversational policy is received in a format created by a program chosen from a group consisting of a word processor, a presentation graphics program, a drawing program, and a software development platform.

15. The computer program product of claim 12, wherein said instructions for identifying elements recognizes a first shape as representing a third one of said plurality of states and a second shape as representing a second one of said plurality of actions.

16. The computer program product of claim 12, wherein said instructions for identifying elements recognizes a first pattern as representing a third one of said plurality of states and a second pattern as representing a second one of said plurality of actions.

* * * * *